United States Patent [19]

Hadzismajlovic

[11] Patent Number: 4,533,367

[45] Date of Patent: Aug. 6, 1985

[54] GAS SCRUBBING METHOD USING GAS LIQUID CONTACT IN A PARTICULATE BED

[76] Inventor: Dzemal Hadzismajlovic, 18 Kondina St., Belgrade, Yugoslavia

[21] Appl. No.: 396,297

[22] Filed: Jul. 8, 1982

[30] Foreign Application Priority Data

Jul. 10, 1981 [AU] Australia .................. PE9693

[51] Int. Cl.³ ..................... B01D 47/14
[52] U.S. Cl. ..................... 55/91; 55/92; 55/93; 55/223; 55/233; 55/258; 55/260; 55/474; 422/140; 422/142; 261/96; 261/98
[58] Field of Search ............ 55/90–93, 55/96, 98, 99, 223, 233, 238, 242, 258, 260, 474; 261/79 A, 94, 96, 98, DIG. 72; 422/139–142; 423/DIG. 16

[56] References Cited

U.S. PATENT DOCUMENTS

| | | | |
|---|---|---|---|
| 2,523,441 | 9/1950 | McKamy | 55/223 |
| 3,122,594 | 2/1964 | Kielback | 55/90 |
| 3,249,395 | 5/1966 | Levey | 422/139 |
| 3,432,994 | 3/1969 | Whiton et al. | 55/91 |
| 3,556,490 | 1/1971 | Bockman | 55/91 |
| 3,733,061 | 5/1973 | Bockman | 55/91 |
| 3,768,234 | 10/1973 | Hardison | 55/233 |
| 4,050,912 | 9/1977 | Hemsath et al. | 55/233 |
| 4,255,168 | 3/1981 | Nguyen | 55/91 |
| 4,334,898 | 6/1982 | Zhuber-Okrog et al. | 55/474 |

FOREIGN PATENT DOCUMENTS

| | | | |
|---|---|---|---|
| 411931 | 4/1925 | Fed. Rep. of Germany | 261/94 |
| 131573 | 10/1979 | Japan | 422/240 |

*Primary Examiner*—David L. Lacey
*Attorney, Agent, or Firm*—Harness, Dickey & Pierce

[57] ABSTRACT

Apparatus and method for cleaning dirty gases using an apparatus comprising a particulate bed through which the dirty gases pass upwardly without being fluidized while a wash liquid descends through the bed. Clean gas supplied to a small region below the bed passes through a channel within the bed. Bed particles, preferably hollow spheres of polypropylene, are entrained in the clean gas and are transported by it to the top of the particulate bed. By this transportation, clogging, dense packing of bed material, and channel formation within the bed, are avoided.

6 Claims, 17 Drawing Figures

GAS SCRUBBING METHOD USING GAS LIQUID CONTACT IN A PARTICULATE BED

TECHNICAL FIELD

This invention concerns gas cleaning. More particularly, it concerns the cleaning of gases using a moving bed of particulate material (such as a moving bed of spherical particles or spheres).

BACKGROUND ART

A known method of cleaning a dirty gas is to pass the dirty gas through a packed particulate bed through which a liquid (usually water) passes in the opposite direction to the gas. This known method of gas cleaning has a number of disadvantages. Among these disadvantages are:
  (a) the method cannot be used to treat gases which are polluted with particulate material, or with pollutants which form precipitates with water or the washing liquid; and
  (b) as the cleaning operation proceeds, the high initial efficiency of the process is reduced due to collection of pollutants in the bed, dense packing of the bed, formation of channels in the bed, and the like.

DISCLOSURE OF THE PRESENT INVENTION

An objective of the present invention is the production of a gas cleaning apparatus (and method) which utilises the high efficiency of the packed bed cleaners, but which does not lose its efficiency with time.

This objective is achieved by using a moving particulate bed, through which (a) a gas to be cleaned passes in one direction, and (b) a wash liquid passes in the opposite direction. The bed is maintained in its moving state by extraction of particles from the lowermost region of the bed, entraining the extracted particles in a relatively high-velocity, clean gas flow, and depositing the entrained particles in the top of the particulate bed.

Thus, according to the present invention, a method of cleaning a dirty gas comprises the steps of:
  (a) passing the dirty gas upwards through a bed of particulate material, while passing a wash liquid downwardly through the bed; and
  (b) extracting particles from the lower region of the bed by entrainment of such particles in an upward-moving stream of clean gas, and depositing the entrained particles on the top of the bed.

Also, according to the present invention, apparatus for cleaning a dirty gas comprises:
  (a) a particulate bed;
  (b) means for feeding the dirty gas into the particulate bed;
  (c) means for supplying a clean gas to a region of the bed for upwards passage of the clean gas therethrough; and
  (d) means for supplying a wash liquid to the upper region of the particulate bed.

In both the method and apparatus of the present invention, the particulate bed is preferably a bed of spherical particles, and more preferably is a bed of hollow spheres, such as spheres made from polypropylene or another material which is resistant to abrasion within the bed, is unaffected by the wash liquid and the gases, and which is also able to withstand the temperatures experienced in the bed without degradation of its physical properties.

Typically the wash liquid will be water, but any suitable solution, liquid, or mixture of liquids may be used, as appropriate.

Usually the clean gas and the basic gas of the dirty gas will be the same gas, but this is not essential.

In the apparatus of the present invention, a distribution plate will usually support the particulate bed, and a funnel or similar tubular structure is preferably located substantially vertically within the particulate bed to form a channel for the upward passage of the particle-entraining clean gas through the bed.

In some cases, it will be necessary to clean a gas in two or more stages, and this may be effected in a single apparatus, in which the particulate beds of each stage are mounted one above the other. In other cases, particularly when large volumes of dirty gas are being cleaned, a plurality of clean gas flows may be used, in parallel, through an extensive particulate bed.

These and other preferred features of the present invention will be more readily appreciated from the following description of embodiments of examples of the present invention, in which reference will be made to the accompanying drawings.

DESCRIPTION OF ILLUSTRATED EMBODIMENTS

Figure 1:
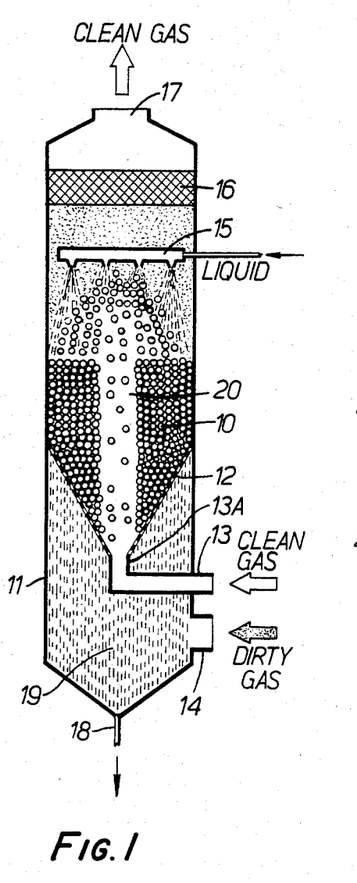
FIGS. 1a and 1b show, schematically, two constructions of a gas cleaner which incorporate the present invention.

In FIG. 1, a particulate bed 10 is retained within a reactor vessel 11 by a perforated plate in the form of a cone 12, which has its narrow end lowermost. The "point" of the cone is connected to a clean gas inlet 13. Dirty gas enters the reactor vessel 11 via a dirty gas inlet 14.

A liquid distribution arrangement 15 is positioned above the bed 10 and is adapted to direct jets or sprays of a wash liquid on to the top of bed 10. Above the liquid distributor 15, a moisture trap 16 prevents liquid from leaving the reactor vessel 11, with clean gas, through gas outlet 17.

A liquid outlet 18 is located at the lower end of reactor vessel 11.

In use (as the gas cleaner is illustrated), wash liquid from the distributor 15 passes downwards through the particulate bed 10 and dirty gas passes upwards through the bed. The counter-current flow of gas and liquid through the bed causes the liquid to effectively wash the gas. The impurities that are dissolved or suspended in the wash liquid pass, with the liquid, into the chamber 19 located below cone 12, and then out of vessel 11 through outlet 18.

The flow rate of dirty gas through the bed 10 is such that the bed particles do not become a fluidized bed. The maximum dirty gas flow is thus to the point where the bed 10 becomes incipiently fluidized. (As the gas velocity through bed 10 increases, the particles at the top of the bed will become fluidized first; thus the maximum velocity of gas through bed 10 will be governed by the incipient fluidization point of the uppermost particles in the bed.)

Clean gas through inlet 13 enters the bed of particles in the form of a jet of gas, at sufficient velocity to cause a spout 20 to be formed within the bed, above the upwardly directed nozzle portion 13A of the clean gas inlet tube.

Particles in the bed 10 which are located alongside the spout 20 are entrained into the spout, carried upward in the clean gas flow, and deposited at the top of the bed. A deflecting plate (not shown) in the shape of an umbrella, a mushroom or simply a curved plate, may be located above the spout region 20 but below the liquid distributor 15 to deflect the particles in the spout onto the top of the bed 10. (A perforated grid 99 is used for this purpose in the embodiments of FIGS. 9a and 9b.)

In the embodiment of FIG. 1(b), a tube 21 is located within the region of spout 20 to provide a wall which forms the bed 10 into an annular bed of particles. Such a tube 21, if present, will be located so that there is a gap 22 between the lower end of tube 21 and the perforated conical grid 12, so that particles in the bed 10 can enter the spout region 20 through gap 22 and become entrained in the spout. The tube 21 may be a perforated tube. The presence of tube 21 prevents radial dirty gas flow into the region of spout 20 and also reduces the minimum clean gas airflow required for efficient operation of the cleaning unit.

Gases that have passed upwards through the bed 10 and through the spout 20 may carry some liquid with them. This is removed in trap 16 before the gases leave the reactor vessel through gas outlet 17.

Various particles may be used for the bed 10. Preferably, however, the bed particles will be hollow spheres, which are constructed of a low density material and which have an outer diameter in the range from 1 cm to 5 cm. With such particles, a low density packing of the bed 10 is achieved, which results in a relatively low pressure of gas being required for proper functioning of the equipment. Polypropylene spheres are well suited for the bed particles, but other spheres which are constructed of a material which resists attrition due to abrasion during the operation of the cleaner, which is chemically inert with respect to the gases used and the wash liquid, and which can withstand the temperatures at which the cleaner is to operate, may be equally suitable.

In an arrangement of the type illustrated in FIGS. 1a and 1b, the diameter of the bed 10 should be at least 30 to 50 times the diameter of the particles of the bed.

The angle of the inverted cone 12 may be of any suitable value, but is preferably in the range from 60 degrees to 90 degrees (i.e., horizontal). The perforated plate 12 should be designed to permit circulation of particles in bed 10 into the spout 20 without the production of a static or "dead" region of the bed. Clearly the perforations in cone 12 must be small enough to prevent the particles in the bed from falling through into chamber 19, and from jamming in the perforations.

Normally, the nozzle region 13A, which directs clean air upwards to form spout 20, will be covered by a grid.

The flow rate of liquid through the bed 10 must be low enough to prevent flooding of the bed, but high enough for efficient washing of the gas passing through the bed.

Variations of the equipment illustrated in FIGS. 1a and 1b are, of course, possible. Some of these variations are illustrated in the other drawings.

In FIGS. 2a and 2b, two multi-stage gas cleaning units which include the present invention are illustrated. The operation of these units should be readily apparent from the description, above, of the gas cleaning equipments illustrated in FIGS. 1a and 1b. Note that only a single wash liquid distributor 15 is used, even though two particulate beds 10 are formed in vessel 11.

FIGS. 3a and 3b illustrate gas cleaning equipments which are particularly suitable for handling high volume gas flows. In the embodiments illustrated, a plurality of spout regions 20 are created in an extensive particulate bed 30.

In the illustrated embodiments of FIGS. 3a and 3b, a corrugated bed supporting, perforated plate 32 extends across the entire width of a reactor vessel 31, and the clean gas inlet 33 extends into the reactor vessel and joins the plate 32 at a number of locations. Above these junctions, clean gas form spouts 20 in the embodiment of FIG. 3(a), and the spouts 20 act as channels through which particles from the lower regions of the bed 30 are conveyed, after being entrained into the clean gas flow through the bed. In the case of the embodiment of FIG. 3(b), tubular funnels 39 (which may be perforated) define channels 20, and particles from the bed 30 enter the clean gas flow through gaps between the funnels 39 and the supporting plate 32.

Figure 5:
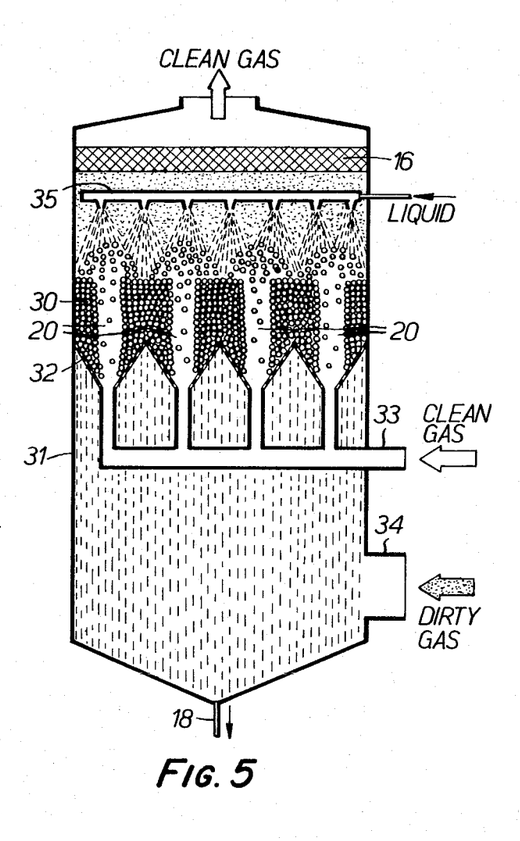
Figure 7:
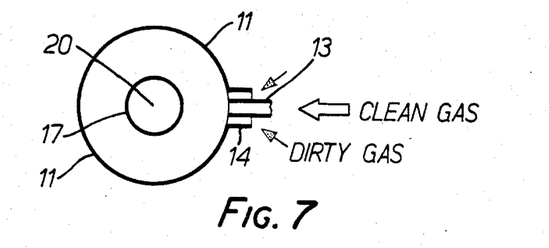
FIGS. 7a, 7b, 8a, 8b, 9a, 9b, 10a, and 10b illustrate modified forms of the apparatus shown in FIG. 1.

In the embodiments shown schematically in FIGS. 7a and 7b, the dirty gas to be cleaned is supplied to the tall particulate bed 70 above the perforated conical plate 72. With this form of the present invention, the dirty gas is preferably fed into the vessel 71 through inlet 74 in a tangential manner, as shown in FIG. 5.

Figure 8:
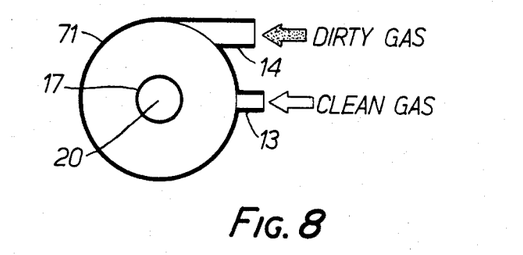

The gas cleaners illustrated in FIGS. 8a and 8b include spray cleaner 88 located in chamber 89, to remove at least some of the pollutants of the dirty gas before the dirty gas enters the bed 80 through the perforations in the inverted conical bed-supporting plate 82. With this embodiment, the dirty gas should enter the chamber 89 in a tangential flow manner, by locating the dirty gas inlet as shown in FIG. 6.

Figure 9:
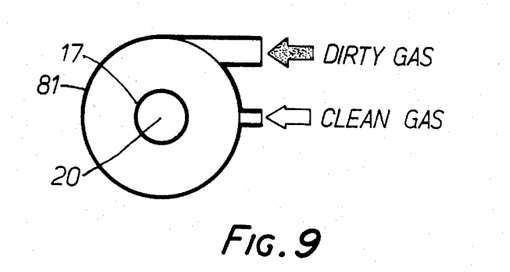

A retaining grid 99 is built into the gas cleaning equipment depicted in FIGS. 9a and 9b. The retaining grid, as indicated earlier in this specification, directs particles entrained in the spout 20 on to the top of the bed 90. It need not be planar, as shown in the embodiments of FIGS. 9a and 9b, but may have any suitable shape.

Figure 10:
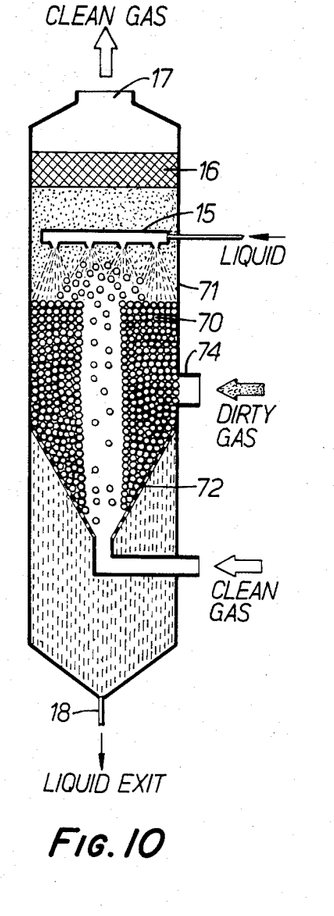
Figure 11:
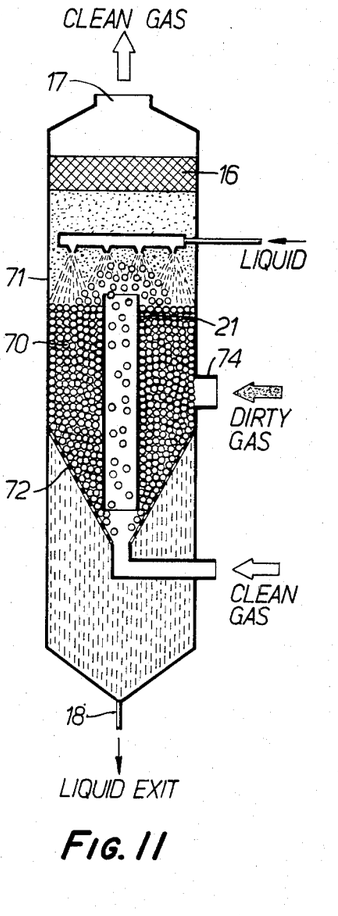
Figure 12:
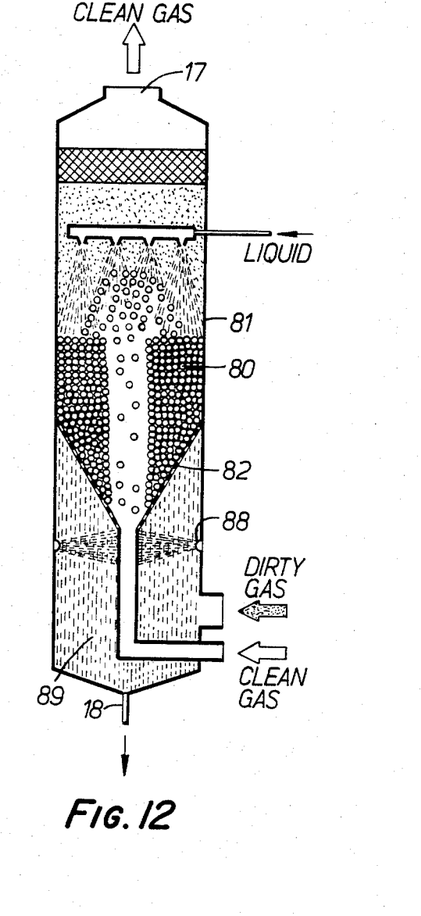
Figure 13:
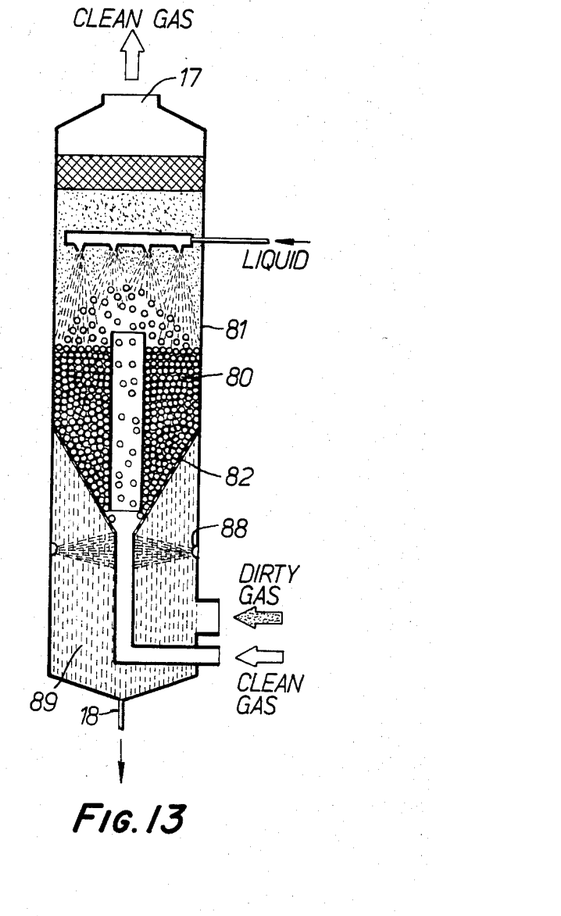
Figure 14:
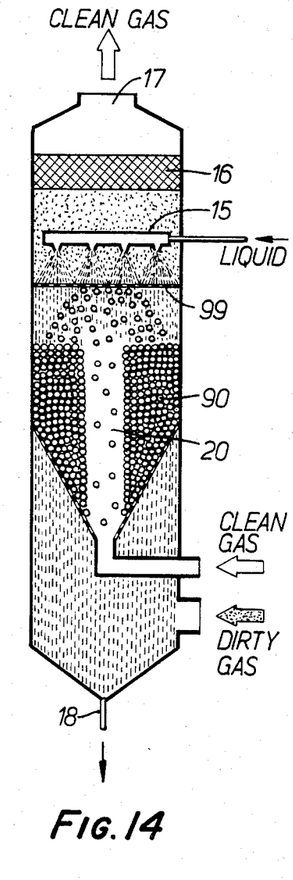
Figure 15:
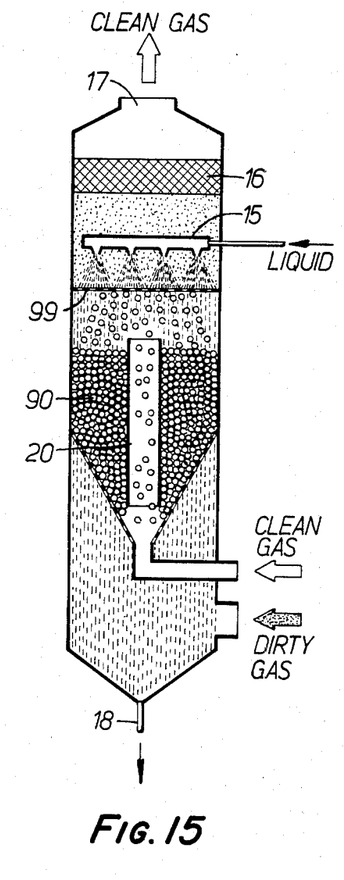

Other modifications which permit a larger volume of gas to be treated than is possible with the arrangement illustrated in FIGS. 1a and 1b is shown in FIGS. 10a and 10b. These embodiments have a reactor vessel 101 which increases in cross-sectional area with distance (upwards) from the perforated conical plate 102. The increase in cross-sectional area of the bed of particles 110 means that the velocity of dirty gas passing through bed 110 can be increased without the risk of reaching the minimum fluidizing velocity at the top of the bed.

Figure 6:
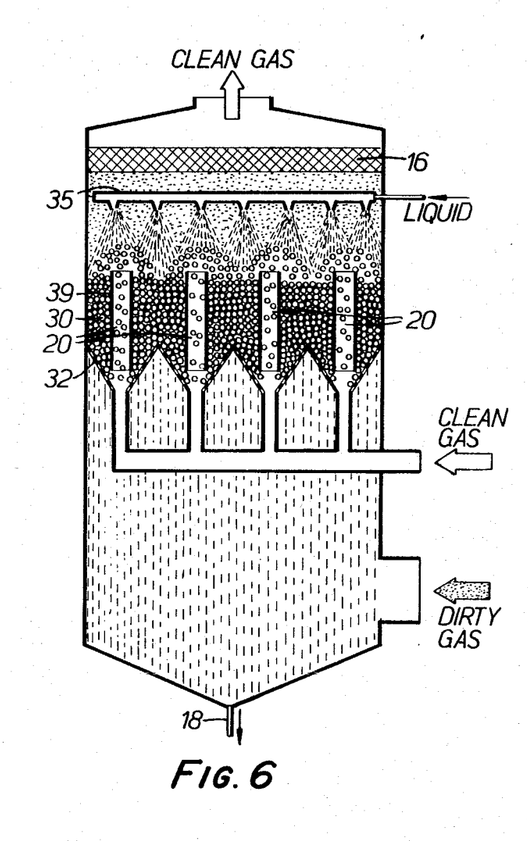

The gas feed arrangements of FIGS. 5 and 6 have already been mentioned.

It may be noted that tangential feeding of dirty gas into a reactor vessel of substantially circular cross-section enables a preliminary separation of dense contaminants (such as particulate solid and liquid contaminants)

by centrifugal action, due to the cyclone-like motion of the gas within the reactor vessel.

Figure 4:
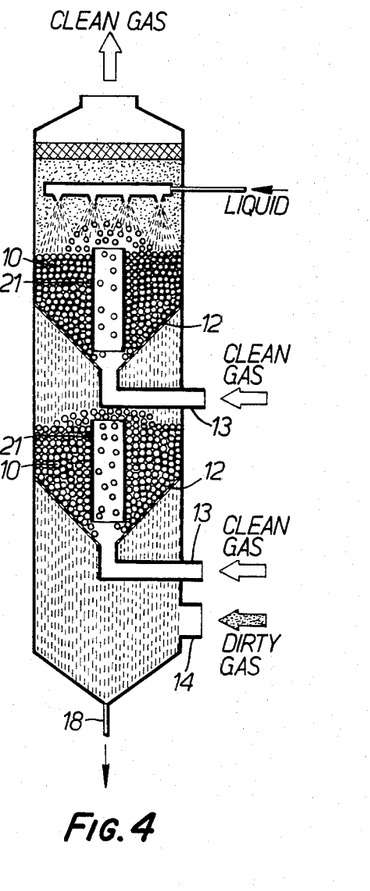
FIGS. 4, 5 and 6 illustrate different arrangements for introducing the dirty and clean gases into the gas cleaning apparatus.

The dirty gas inlet 14 of FIG. 4 supplies the dirty gas to the chamber 19 at right angles to the tangent to the wall of vessel 11 at the mid-point of the dirty gas inlet 14.

In most gas cleaning operations, the wash liquid will be water and the clean gas will be clean air. However, as indicated earlier in this specification, other liquids and gases may be used to suit particular cleaning operations.

Other variations and modifications of the present invention may be made without departing from the present inventive concept.

I claim:

1. A method of cleaning a dirty gas comprising the steps of:
   (a) passing the dirty gas upwards through a bed of particulate material without fluidizing the bed,
   (b) passing a wash liquid downwardly through the bed,
   (c) entraining a portion of such bed particles in an upward-moving stream of clean gas, and depositing the entrained particles on the top of said bed.

2. A method as defined in claim 1, in which the particulate bed is a bed of substantially spherical particles.

3. A method as defined in claim 2, in which the spherical particles are hollow spheres made of polypropylene.

4. A method as defined in claim 1, claim 2 or claim 3, in which the dirty gas has a major component which is the same gas as said clean gas, and in which the wash liquid is water.

5. A multi-stage method of cleaning a dirty gas, comprising the steps of:
   (a) passing the dirty gas upwards through, in series, a plurality of beds of particulate material without fluidizing said beds, while passing a wash liquid downwardly through each of the beds; and
   (b) extracting bed particles from the lower region of each of said beds by entrainment of such bed particles in a respective upward-moving stream of clean gas and depositing the entrained bed particles on the top of their respective beds.

6. A method as defined in claim 5, in which each particulate bed comprises a bed of hollow spheres of polypropylene.

* * * * *

UNITED STATES PATENT AND TRADEMARK OFFICE
CERTIFICATE OF CORRECTION

PATENT NO. : 4,533,367

DATED : August 6, 1985

INVENTOR(S) : Dzemal Hadzismajlovic

Figure 2:
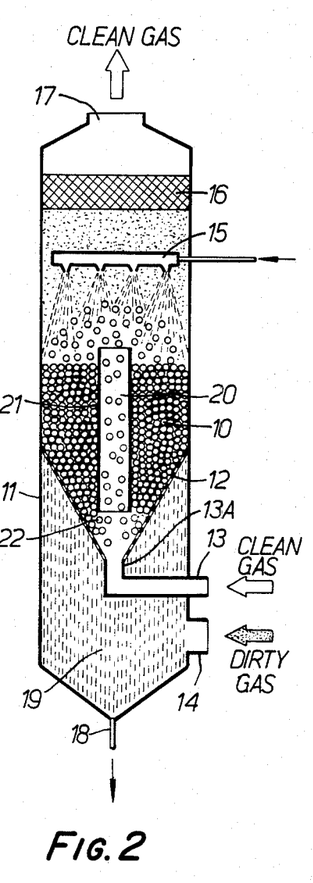
FIGS. 2a and 2b illustrate, schematically, two forms of multi-stage gas cleaner, in which the stages of cleaning are performed sequentially.

It is certified that error appears in the above-identified patent and that said Letters Patent is hereby corrected as shown below:

Column 2, line 26
"Figures 1a and 1b" should be --Figures 1 and 2--.

Figure 3:
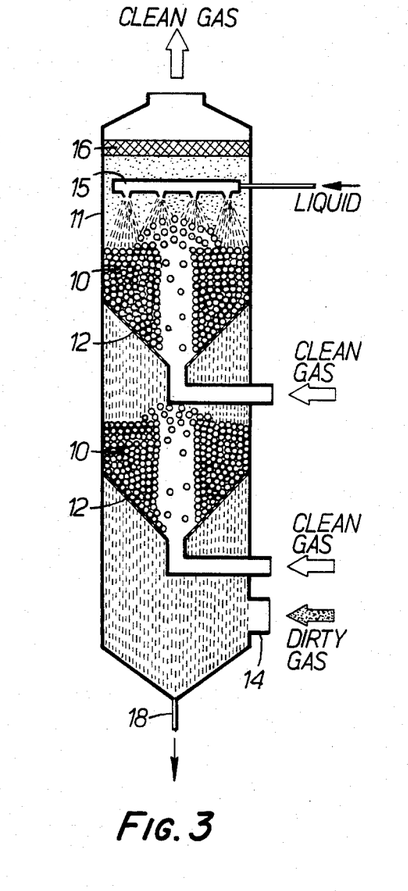
FIGS. 3a and 3b are schematic representations of two forms of gas cleaner, in which large volumes of gas may be cleaned.

Column 2, line 29
"Figures 2a and 2b" should be --Figures 3 and 4--.

Column 2, line 32
"Figures 3a and 3b" should be --Figures 5 and 6--.

Column 2, line 35
"4, 5 and 6" should be --7, 8 and 9--.

Column 2, line 38
"7a, 7b, 8a, 8b, 9a, 9b, 10a and 10b" should be --10 through 17--.

Column 2, line 43
"Figure 1" should be --Figures 1 and 2--.

Column 3, lines 21-22
"9a and 9b" should be --14 and 15--.

Column 3, line 22
"1(b)" should be --2--.

Column 3, lines 53-54
"1a and 1b" should be --1 and 2--.

UNITED STATES PATENT AND TRADEMARK OFFICE
CERTIFICATE OF CORRECTION

PATENT NO. : 4,533,367

DATED : August 6, 1985

INVENTOR(S) : Dzemal Hadzismajlovic

It is certified that error appears in the above-identified patent and that said Letters Patent is hereby corrected as shown below:

Column 4, lines 3-4
"1a and 1b" should be --1 and 2--.

Column 4, line 6
"2a and 2b" should be --3 and 4--.

Column 4, line 10
"Figures 1a and 1b" should be --Figures 1 and 2--.

Column 4, line 13
"3a and 3b" should be --5 and 6--.

Column 4, line 18
"3a and 3b" should be --5 and 6--.

Column 4, line 24
"3(a)" should be --5--.

Column 4, lines 27-28
"3(b)" should be --6--.

Column 4, lines 32-33
"7a and 7b" should be --10 and 11--.

Column 4, line 37
"5" should be --8--.

Column 4, line 38
"8a and 8b" should be --12 and 13--.

UNITED STATES PATENT AND TRADEMARK OFFICE
CERTIFICATE OF CORRECTION

PATENT NO. : 4,533,367

DATED : August 6, 1985

INVENTOR(S) : Dzemal Hadzismajlovic

It is certified that error appears in the above-identified patent and that said Letters Patent is hereby corrected as shown below:

Column 4, line 39
   After "include" insert --a--.

Column 4, line 45
   "6" should be --9--.

Column 4, line 47
   "9a and 9b" should be --14 and 15--.

Column 4, line 51
   "9a and 9b" should be --14 and 15--.

Column 4, line 55
   "1a and 1b" should be --Figures 1 and 2--.

Column 4, lines 55-56
   "10a and 10b" should be --16 and 17--.

Column 4, line 63
   "5 and 6" should be --8 and 9--.

Column 5, line 3
   "4" should be --7--.

Signed and Sealed this

Fifteenth Day of July 1986

[SEAL]

Attest:

DONALD J. QUIGG

Attesting Officer

Commissioner of Patents and Trademarks